United States Patent
Heck (10) Patent No.: US 11,220,345 B2
(45) Date of Patent: Jan. 11, 2022

(54) LEADING EDGE STRUCTURE FOR A FLOW CONTROL SYSTEM OF AN AIRCRAFT

(71) Applicant: Airbus Operations GmbH, Hamburg (DE)

(72) Inventor: Christian Heck, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 488 days.

(21) Appl. No.: 16/233,875

(22) Filed: Dec. 27, 2018

(65) Prior Publication Data

US 2019/0202566 A1    Jul. 4, 2019

(30) Foreign Application Priority Data

Dec. 28, 2017 (DE) .................... 10 2017 131 369.9

(51) Int. Cl.
| | | |
|---|---|---|
| B64D 15/04 | (2006.01) | |
| B64C 21/06 | (2006.01) | |
| B64C 3/28 | (2006.01) | |
| B64C 5/02 | (2006.01) | |
| B64C 3/26 | (2006.01) | |

(52) U.S. Cl.
CPC ................ B64D 15/04 (2013.01); B64C 3/26 (2013.01); B64C 3/28 (2013.01); B64C 5/02 (2013.01); B64C 21/06 (2013.01); *B64C 2230/04* (2013.01); *B64C 2230/22* (2013.01)

(58) Field of Classification Search
CPC ...... B64C 21/06; B64C 2230/22; B64D 15/04
See application file for complete search history.

(56) References Cited

U.S. PATENT DOCUMENTS

| 2,111,530 A | 3/1938 | Seversky |
|---|---|---|
| 2,742,247 A | 4/1956 | Lachmann |

(Continued)

FOREIGN PATENT DOCUMENTS

| DE | 936 618 | 12/1955 |
|---|---|---|
| DE | 10 2004 024 007 | 4/2006 |

(Continued)

OTHER PUBLICATIONS

Search Report for DE 10 2017 131 369.9 dated Nov. 7, 2018, 8 pages.

(Continued)

*Primary Examiner* — Richard R. Green
*Assistant Examiner* — Michael B. Kreiner
(74) *Attorney, Agent, or Firm* — Nixon & Vanderhye P.C.

(57) ABSTRACT

A leading edge structure (13) for a flow control system of an aircraft (1), including a double-walled leading edge panel having an inner wall element (45) and an outer wall element (47). Between the inner and outer wall elements (45, 47) are elongate stiffeners (49) spaced apart from one another. And, between adjacent stiffeners (49) are a hollow chamber (51). The outer wall element (47) includes micro pores (53). The inner wall element (45) includes passages (55) forming a fluid connection between the hollow chambers (51) and a vacuum system (15). An ice protection system in the stiffeners (49) includes hot air ducts (57) configured for connection to a hot air system (17), and the stiffeners (49) include hot air openings (59) forming a fluid connection between the hot air ducts (57) and the hollow chambers (51).

20 Claims, 4 Drawing Sheets

(56) References Cited

U.S. PATENT DOCUMENTS

| | | | |
|---|---|---|---|
| 3,213,527 A | 10/1965 | Glaze | |
| 4,000,869 A | 1/1977 | Wong | |
| 5,114,100 A * | 5/1992 | Rudolph | B64C 21/06 244/134 C |
| 5,263,667 A | 11/1993 | Horstman | |
| 5,366,177 A * | 11/1994 | DeCoux | B64C 21/06 244/201 |
| 5,398,410 A | 3/1995 | Yasui et al. | |
| 5,743,488 A | 4/1998 | Rolston et al. | |
| 5,806,796 A | 9/1998 | Healey | |
| 5,899,416 A | 5/1999 | Meister et al. | |
| 5,923,003 A | 7/1999 | Arcas et al. | |
| 5,944,287 A * | 8/1999 | Rodgers | B64D 15/04 244/134 R |
| 6,050,523 A | 4/2000 | Karenzien | |
| 6,135,395 A | 10/2000 | Collett | |
| 6,612,524 B2 | 9/2003 | Billman et al. | |
| 6,622,973 B2 | 9/2003 | Al-Garni et al. | |
| 6,752,358 B1 | 6/2004 | Williams et al. | |
| 7,048,230 B2 | 5/2006 | Meyer | |
| 7,673,832 B2 | 3/2010 | Meister | |
| 7,743,884 B2 | 6/2010 | Thomas et al. | |
| 7,922,126 B2 | 4/2011 | Meister | |
| 8,091,837 B2 | 1/2012 | Frankenberger et al. | |
| 8,282,037 B2 | 10/2012 | Ashok | |
| 8,459,597 B2 | 6/2013 | Cloft et al. | |
| 8,596,573 B2 | 12/2013 | Ashok | |
| 9,193,443 B2 | 11/2015 | Voege | |
| 10,005,545 B2 | 6/2018 | Aldermand et al. | |
| 2003/0132351 A1 | 7/2003 | Billman et al. | |
| 2003/0136815 A1 | 7/2003 | Debaisieux et al. | |
| 2005/0045774 A1 | 3/2005 | Hocking | |
| 2005/0151026 A1 | 7/2005 | Meyer | |
| 2007/0221788 A1 | 9/2007 | Meister | |
| 2008/0296439 A1 | 12/2008 | Cloft et al. | |
| 2009/0210103 A1 | 8/2009 | Cook | |
| 2009/0212165 A1 | 8/2009 | Parkh | |
| 2010/0116943 A1 * | 5/2010 | Meister | B64C 21/08 244/208 |
| 2010/0187360 A1 | 7/2010 | Rawlings et al. | |
| 2010/0187361 A1 | 7/2010 | Rawlings et al. | |
| 2010/0294892 A1 | 11/2010 | Syassen | |
| 2011/0117338 A1 | 5/2011 | Poquette et al. | |
| 2011/0212291 A1 | 9/2011 | Buellesbach | |
| 2014/0021304 A1 | 1/2014 | Gerber et al. | |
| 2016/0332724 A1 * | 11/2016 | Mehring | B64D 33/10 |
| 2017/0217569 A1 * | 8/2017 | Gueuning | B64C 5/06 |
| 2018/0194457 A1 * | 7/2018 | Gueuning | B64D 15/04 |

FOREIGN PATENT DOCUMENTS

| | | |
|---|---|---|
| EP | 0 679 572 | 11/1995 |
| EP | 0 845 410 | 6/1998 |
| EP | 2 886 453 | 6/2015 |
| EP | 2 891 606 A1 | 7/2015 |
| EP | 3 020 631 | 5/2016 |
| GB | 2324351 A | 10/1998 |
| WO | 2011/128069 A1 | 10/2011 |
| WO | 2017/005737 | 1/2017 |

OTHER PUBLICATIONS

Wong et al. "Drag Reduction Using Boundary Layer Suction and Blowing", CEAS/KATnet Conference on Key Aerodynamic Technologies (Jun. 2005).

Schrauf et al, "Simplified Hybrid Laminar Flow Control", European Congress on Computational Methods in Applied Science and Engineering CCOMAS 2004 (Jul. 2004).

Schrauf "Status and Perspective of Laminar Flow" The Aeronautical Journal, vol. 109, pp. 639-644 (Dec. 2005).

Wagner et al, "Laminar Flow Control Leading Edge Systems in Simulated Airline Service," 16th Congress of the International Council of the Aeronautical Sciences (Aug. 1988).

Braslow "A History of Suction-Type Laminar Flow Control with Emphasis on Flight Research", NASA History Division, Monographs in Aerospace History, No. 13 (1999).

Wong et al, "Studies of Methods and Philosophies for Designing Hybrid Laminar Flow Wings," ICAS 2000 Congress, pp. 282.1 to 282.11 (Aug. 2000).

Joslin, "Aircraft Laminar Flow Control", Annular Review of Fluid Mechanics, vol. 30; pp. 1-29 (1998).

Henke, "A 320 HLF Fin: Flight Test Completed", Air & Space Europe, vol. 1, No. 2 (1999).

"Hight Reynolds Number Hybrid Laminar Flow Control (HLFC) Flight Experiment: IV Suction System Design and Manufacture", NASA/CR-1999-209326 (Apr. 1999).

Schmitt et al, "Hybrid Laminar Fin Investigation", Paper RTO AVT Symposium on Active Technology for Enhanced Performance Operational Capabilities of Military Aircraft, Land Vehicles and Sea Vehicles, RTO MP-051 (May 2000).

European Search Report cited in EP 18212956.9 dated Apr. 24, 2019, 7 pages.

* cited by examiner

LEADING EDGE STRUCTURE FOR A FLOW CONTROL SYSTEM OF AN AIRCRAFT

RELATED APPLICATION

This application claims priority to German patent application DE 10 2017 131 369.9 filed Dec. 28, 2017, the entirety of which is incorporated by reference.

FIELD

The present invention relates to a leading edge structure for a flow control system of an aircraft, in particular for a hybrid laminar flow control (HLFC) system of a horizontal plane for an aircraft, such as a wing or a horizontal tail plane (HTP), with an integrated ice protection system. Further aspects of the invention relate to a horizontal plane for an aircraft, in particular a wing or a horizontal tail plane, comprising such a leading edge structure, and to an aircraft comprising such a leading edge structure or comprising such a horizontal plane.

BACKGROUND AND SUMMARY

A leading edge structure for a wing or other aerodynamic lifting or control structure in an aircraft may comprise a double-walled leading edge panel extending continuously, such as constantly, in a span direction. Across the span direction, the leading edge panel extends between a leading edge portion and a downstream portion downstream from the leading edge portion with respect to an ambient flow of the aircraft during flight.

The leading edge panel may be curved such that it partially surrounds an interior region of the wing or aerodynamic lifting or control structure. The leading edge portion has a curved leading edge and a downstream portion extends from the leading edge with less curvature than the leading edge. The leading edge portion includes a first end at the leading edge and a second end opposite the first end, wherein the second end may be configured to be mounted to a front spar or a box of a wing or a horizontal tail plane.

The leading edge panel comprises an inner wall element facing the interior and an outer wall element configured to be in contact with the ambient flow of air over the aerodynamic lifting or control structure. Between the inner and outer wall elements, the leading edge panel comprises a plurality of elongate stiffeners spaced apart from one another. Between each pair of adjacent stiffeners, a hollow chamber is formed between the inner and outer wall elements.

The outer wall element comprises a plurality of micro pores forming a fluid connection between the hollow chambers and the ambient flow. The inner wall element comprises passages forming a fluid connection between the hollow chambers and a vacuum system. The passages might be in the form of holes in the inner wall element, or might be in the form of channels such as extending parallel to the surface of the inner wall element.

The vacuum system may include a common suction plenum or several suction pipes, wherein both the suction plenum and the suction pipes are connected to a vacuum source. The vacuum source may be an active vacuum source, such as a compressor or an engine, or a passive vacuum source such as a diffusor having a flap that opens in the ambient flow with a rear facing opening.

Similar hybrid laminar flow control systems are known, specifically in connection with the vertical tail plane (VTP). VTPs usually do not have associated ice protection systems (IPS), which allows a comparably simple integration of the HLFC system at the VTP. However, integration of a HLFC system in a horizontal plane, in particular in a wing, might be more complicated as IPS's are often required in the area of the leading edge where the HLFC system is to be included.

An ice protection system for a leading edge structure for a flow control system has been invented and is disclosed herein.

The ice protection system may be embodied in stiffeners that include hot air ducts for passing hot air along the longitudinal extension of the stiffeners. The hot air ducts may be formed inside the stiffeners or between opposite walls of each one stiffener. The hot air ducts are configured for connection to a hot air system.

The hot air system may include hot air pipes connected to the hot air ducts and connected to a hot air source, such as an engine providing hot air in the form of bleed air from the engine.

The stiffeners further include a plurality of hot air openings forming a fluid connection between the hot air ducts and the hollow chambers for passing hot air from the hot air system through the hot air ducts and the hot air openings to the hollow chambers. The hot air flowing through the hollow chambers flows through the micro pores and into the ambient flow to deice the outer surface of the outer wall element. The hot air openings may be formed in a serial manner along the longitudinal extension of the stiffeners.

The ice protection system may be integrated in the HLFC leading edge structure. The integration need not require significant changes to the design optimized for flow control. Flow control may be performed by applying a vacuum by the vacuum source to the hollow chambers which draws air from the ambient air flow, in particular the boundary layer, through the micro pores into the hollow chambers, thereby causing a laminar flow downstream from the micro pores. Ice protection or deicing is performed by blowing hot air provided by the hot air source through the hot air ducts and from there through the hollow chambers in order to heat the outer wall element. Additionally, hot air from the hollow chambers is discharged through he micro pores to deice or heat the outer surface of the outer wall element. Flow control, such as suction, and ice protection, such as blowing of hot air, may be performed only in a sequential manner such that suction and ice protection steps are not performed at the same time. However, there might also be embodiments where suction and blowing are performed at the same time.

The stiffeners may extend longitudinally in the span direction. In such a way, flow control and ice protection can be performed continuously in the span direction.

The stiffeners may have an omega-shaped cross section across their longitudinal extension including an upper flange portion resting against the outer wall element, first and second lower flange portions resting against the inner wall element, a first web portion connecting the upper flange portion to the first lower flange portion, and a second web portion connecting the upper flange portion to the second lower flange portion. The hot air openings are included in the first web portion and/or in the second web portion. As an alternative to the omega-shaped cross section the stiffeners might also be formed with a trapezoid-shaped cross section or a square-shaped cross section, which correspond to the above-described omega-shaped cross section with the exception that the first and second lower flange portions point to one another or are connected to one another, instead of pointing away from one another. Such geometry of the stiffeners provides advantageous mechanical properties and at the same time allows to include the hot air duct.

In particular, the hot air duct may be formed between the upper flange portion, the first web portion, the second web portion and the inner wall element. In such a way, the stiffener only surrounds three of four sides of the hot air duct, while the fourth side is surrounded by the inner wall element.

Alternatively, the stiffeners additionally include a cross portion extending from the first web portion to the second web portion at a position between the upper flange portion and the first and second lower flange portions. The hot air duct may be formed between the cross portion, the upper flange portion, and the first and second web portions, wherein an insulation chamber is formed between the cross portion, the inner wall element, and the first and second web portions for insulating the inner wall element from the hot air duct. This is particularly useful in cases when the inner wall element is formed of a heat-sensitive material, such as a fiber reinforced plastic (FRP).

The inner wall element may be formed of a plastic material, such as a fiber reinforced plastic (FRP), such as a carbon fiber reinforced plastic or a glass fiber reinforced plastic. Additionally, the stiffeners may be formed from a FRP and may be formed integrally with the inner wall element. In such a way, a lightweight and stiff structure can be formed that can be pre-manufactured as one common part.

Alternatively, the inner wall element might be formed of a sheet metal, such as e.g. aluminum or steel. Such materials are less temperature sensitive, so that the cross portion might not be necessary in this case.

As a further alternative, the inner wall element might be formed as a sandwich structure including an outer cover layer, an inner cover layer, and a core layer sandwiched between the outer and inner cover layers. The outer and inner cover layers might be formed from a FRP material or a metal material, while the core layer might be formed of a foam material. By such a sandwich structure, specific mechanic properties of the inner wall element can be obtained.

In particular, the passages may be formed as suction channels that extend through the core layer in parallel to the stiffeners and that have a plurality of suction ports to the hollow chambers arranged in a serial manner along the longitudinal extension of the suction channels and forming a fluid connection between the suction channels and the hollow chambers. The suction channels are connected to the vacuum system, such as to the suction pipes, and via the suction pipes to the vacuum source. In such a way, the space within the core layer of the sandwich structure inner wall element can be used for accommodating the suction channels to provide an efficient distribution of the vacuum applied through the suction pipes to the hollow chambers. No suction plenum is required in this case.

The vacuum system may comprise a common suction plenum next to the inner wall element. The suction plenum might be connected to the vacuum source, such as via one more suction pipes. Such a common suction plenum can be pressurized by the vacuum source with a single, common pressure that is then applied to the hollow chambers through the passages. The passages might be formed as simple, not specifically defined holes, so that the pressure in the hollow chambers is essentially the same as the pressure in the plenum. However, the passages might also be formed as throttle holes having a predefined diameter adapted for a predefined mass flow rate through the throttle holes in order to achieve a predefined fluid pressure in the hollow chambers.

The leading edge structure may further comprise a plenum wall extending opposite and spaced apart from the inner wall element, thereby defining or enclosing the suction plenum between the plenum wall and the inner wall element. Such a plenum wall separated the pressured plenum from other wing parts accommodated under the leading edge structure of the wing, such as high lift devices, specifically Krueger flaps.

The vacuum system may comprise a vacuum source for applying a vacuum through the suction pipes and through the passages to the hollow chambers in order to draw air from the ambient air flow through the micro pores into the hollow chambers. The vacuum source might be formed active, e.g. as a compressor or an engine, or might be formed passive, e.g. as a flap that opens in the ambient flow with a rear facing opening. The vacuum source might be connected directly or via the suction pipes to the plenum or to the suction channels.

The outer wall element may be formed as a titanium sheet or a steel sheet. Such material gives the leading edge the required strength and erosion resistance.

A plurality of support ribs may be attached to the inner wall element in such a way that they face the interior and extend across the span direction along the inner wall element. The support ribs may be formed integrally with the inner wall element and are formed of FRP. The support ribs additionally support the inner wall element.

The stiffeners, the inner wall element and the support ribs may be formed together as an integral part by a Resin Transfer Molding (RTM) process. Also, the stiffeners and inner wall element may be formed as an integral part and separately of the support ribs.

The outer wall element may comprise multiple sections when viewed from the leading edge downstream, wherein the porosity varies from one section to another section in terms of pore diameter and/or pore pitch. In such a way, the amount ambient air that is sucked in through the micro pores can be adapted as required in the specific section.

A further aspect of the present invention relates to a horizontal plane for an aircraft, namely to a wing or a horizontal tail plane. The horizontal plane comprises a front spar, an outer skin, a leading edge structure according to any of the afore-described embodiments, a vacuum system, and a hot air system. The leading edge structure is arranged in front of the front spar and may be attached to the front spar by the second end, such that the outer wall element is aligned with the outer skin. The leading edge structure may be further supported along its extension across the span direction by a plurality of support ribs connected to the front spar and extending in a plane transverse the span direction and in a subsequent manner in the span direction. The vacuum system is connected to the passages for applying a vacuum through the passages to the hollow chambers. The vacuum system might include a plenum and/or one or more suction pipes connected to an active or passive vacuum source, such as a compressor or an engine or a rear facing opening in the ambient flow. The hot air system is connected to the hot air ducts to blow hot air through the hot air ducts to the hollow chambers, such as through the micro pores to the ambient flow. The hot air system may include one or more hot air pipes that are connected to a hot air source, such as an engine providing bleed air. The features and advantages described above in connection with the leading edge structure apply vis-à-vis also to the horizontal plane.

The invention may be embodied as an aircraft comprising a leading edge structure according to any of afore-described embodiments, or comprising a horizontal plane according to any of the afore-described embodiments. The aircraft might include the vacuum source and/or the hot air source, such as in the form of an engine. The features and advantages described above in connection with the leading edge structure or with the horizontal plane apply vis-à-vis also to the aircraft

SUMMARY OF FIGURES

Embodiments of the present invention are explained hereinafter in more detail by means of a drawing. The drawing shows in FIG. 1 is an top view of an aircraft according to an embodiment of the invention.

DETAILED DESCRIPTION

Figure 1:
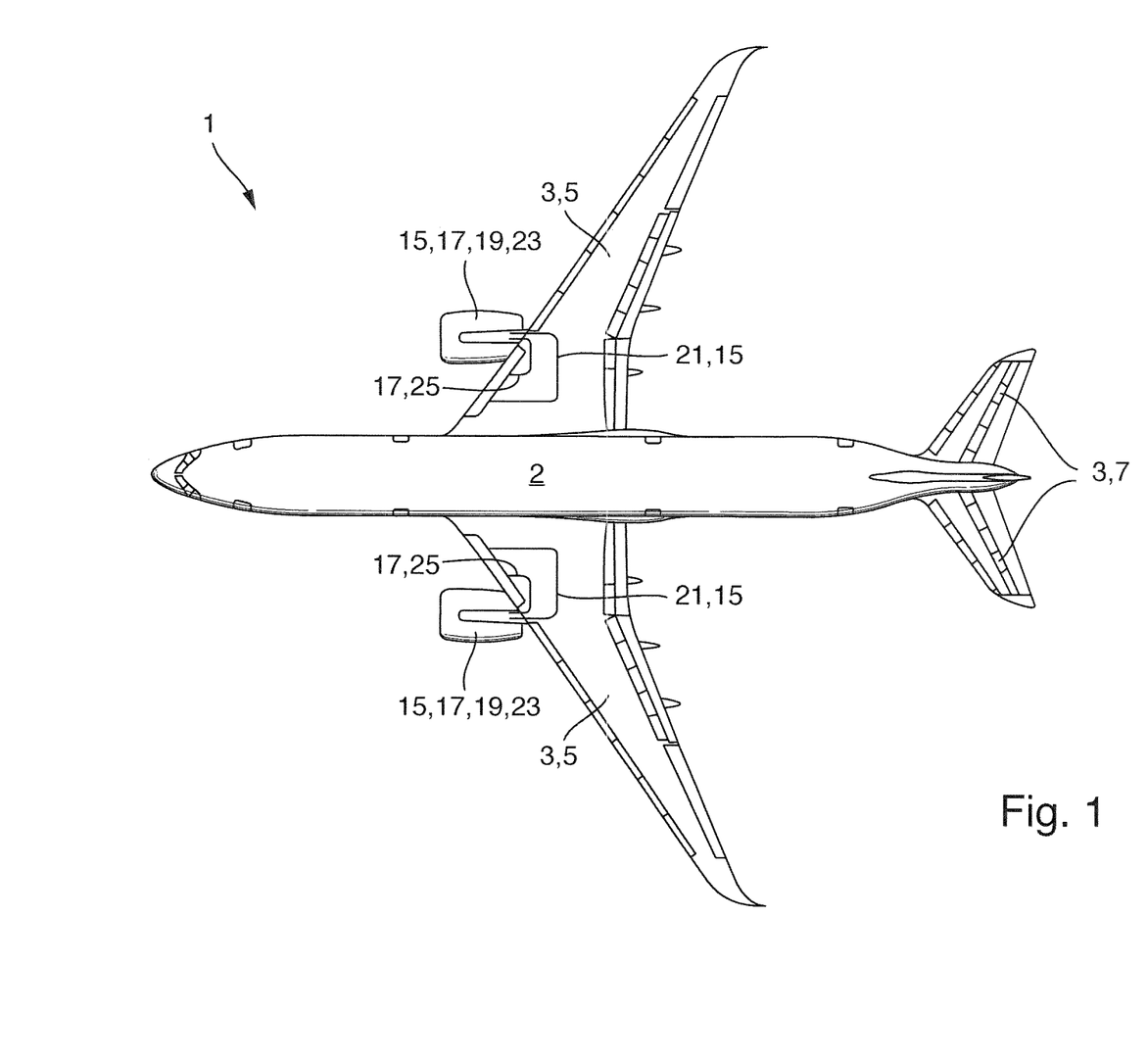

FIG. 1 shows an aircraft 1 according to an embodiment of the present invention with a flow control system and an integrated ice protection system. The aircraft 1 comprises a fuselage 2 and horizontal planes 3 in the form of wings 5 and horizontal tail planes 7. Each wing 5 comprises a front spar 9, an outer skin 11, a leading edge structure 13, a vacuum system 15, and a hot air system 17. The vacuum system 15 comprises a vacuum source 19 in the form of an engine, and at least one suction pipe 21 connecting the vacuum source 19 to the leading edge structure 13. The hot air system 17 comprises a hot air source 23 also in form of the engine, and at least one hot air pipe 25 connecting the hot air source 23 to the leading edge structure 13.

The leading edge structure 13 might be in the form of one of the embodiments shown in any of FIGS. 2 to 5. In any of these embodiments the leading edge structure 13 comprises a double-walled leading edge panel 27 extending in a span direction 29. Across the span direction 29 the leading edge panel 27 extends between a leading edge portion 31 and a downstream portion 33 downstream from the leading edge portion 31 with respect to an ambient flow 35 of the aircraft 1 during flight. The leading edge panel 27 is curved such that it partially surrounds an interior 37, wherein the leading edge portion 31 is curved around a leading edge 39 and includes a first end 41, while the downstream portion 33 extends with less curvature than the leading edge portion 31, and includes a second end 43 opposite the first end 41.

The leading edge panel 27 comprises an inner wall element 45 facing the interior 37 and an outer wall element 47 in contact with the ambient flow 35. Between the inner and outer wall elements 45, 47 the leading edge panel 27 comprises a plurality of elongate stiffeners 49 extending longitudinally in the span direction 29 and spaced apart from one another, so that between each pair of adjacent stiffeners 49 a hollow chamber 51 is formed between the inner and outer wall elements 45, 47. The outer wall element 47 is formed of a titanium sheet and comprises a plurality of micro pores 53 forming a fluid connection between the hollow chambers 51 and the ambient flow 35. The inner wall element 45 comprises passages 55 forming a fluid connection between the hollow chambers 51 and the vacuum system 15 connected to the passages 55 for applying a vacuum through the passages 55 to the hollow chambers 51. The leading edge structure 13 is arranged in front of the front spar 9 and is attached to the front spar 9 by the second end 43, such that the outer wall element 47 is aligned with the outer skin 11.

The stiffeners 49 form hot air ducts 57 for passing hot air along the longitudinal extension of the stiffeners 49. The hot air ducts 57 are connected to the hot air system 17, specifically to the hot air pipes 25 that in turn are connected to the hot air source 23. The stiffeners 49 further include a plurality of hot air openings 59 forming a fluid connection between the hot air ducts 57 and the hollow chambers 51 for passing hot air from the hot air system 17 through the hot air ducts 57 and the hot air openings 59 to the hollow chambers 51, and further through the micro pores 53 to the ambient flow 35. The hot air openings 59 are formed in a serial manner along the longitudinal extension of the stiffeners 49.

The stiffeners 49 have an omega-shaped cross section across their longitudinal extension including an upper flange portion 61 resting against the outer wall element 47, first and second lower flange portions 63, 65 resting against the inner wall element 45, a first web portion 67 connecting the upper flange portion 61 to the first lower flange portion 63, and a second web portion 69 connecting the upper flange portion 61 to the second lower flange portion 65. The hot air openings 59 are included in the first web portion 67 and in the second web portion 69.

Figure 2:
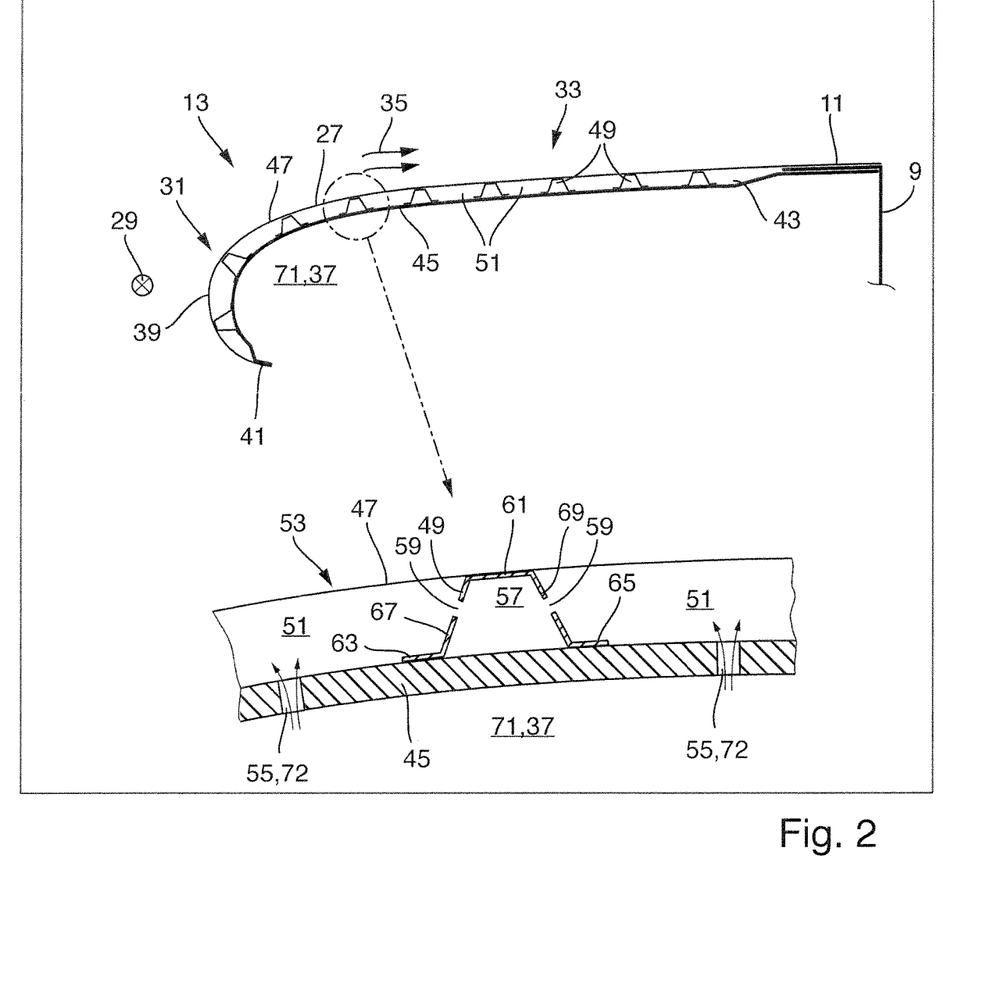
FIG. 2 is a schematic cross sectional view of a leading edge structure according to a first embodiment of the present invention.

In the embodiment shown in FIG. 2, the hot air duct 57 is formed between the upper flange portion 61, the first web portion 67, the second web portion 69 and the inner wall element 45. In this embodiment, the inner wall element 45 might be formed of a sheet metal material. The vacuum system 15 comprises a common suction plenum 71 next to the inner wall element 45. The passages 55 are formed as holes 72 in the inner wall element 45 connecting the hollow chambers 51 to the suction plenum 71. The suction plenum 71 is connected to the vacuum source 19 via the suction pipes 21.

Figure 3:
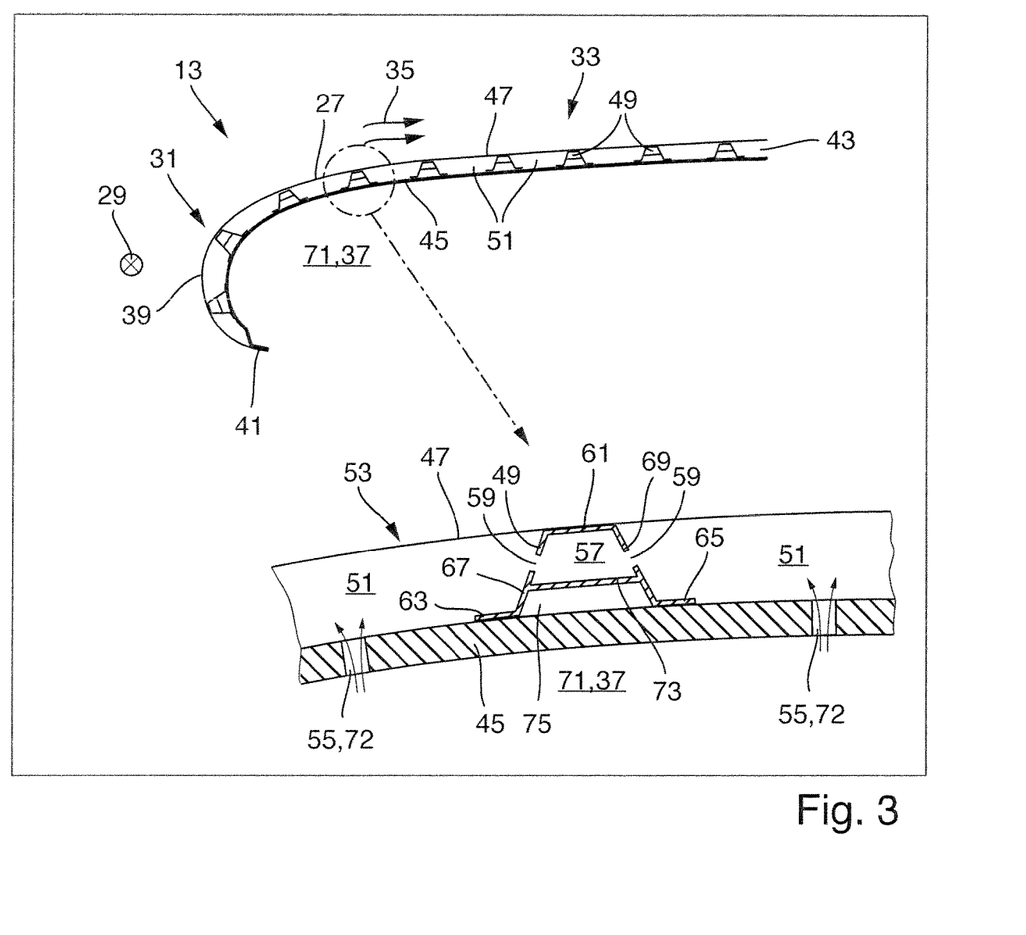
FIG. 3 is a schematic cross sectional view of a leading edge structure according to a second embodiment of the present invention.

The embodiment shown in FIG. 3 is similar to the embodiment from FIG. 1 but the stiffeners 49 additionally include a cross portion 73 extending from the first web portion 67 to the second web portion 69 at a position between the upper flange portion 61 and the first and second lower flange portions 63, 65. The hot air duct 57 is formed between the cross portion 73, the upper flange portion 61, and the first and second web portions 67, 69, wherein an insulation chamber 75 is formed between the cross portion 73, the inner wall element 45, and the first and second web portions 67, 69 for insulating the inner wall element 45 from the hot air duct 57. This insulation chamber 75 is particularly advantageous since the inner wall element 45 is formed of a heat-sensitive fiber reinforced plastic (FRP) material.

Figure 4:
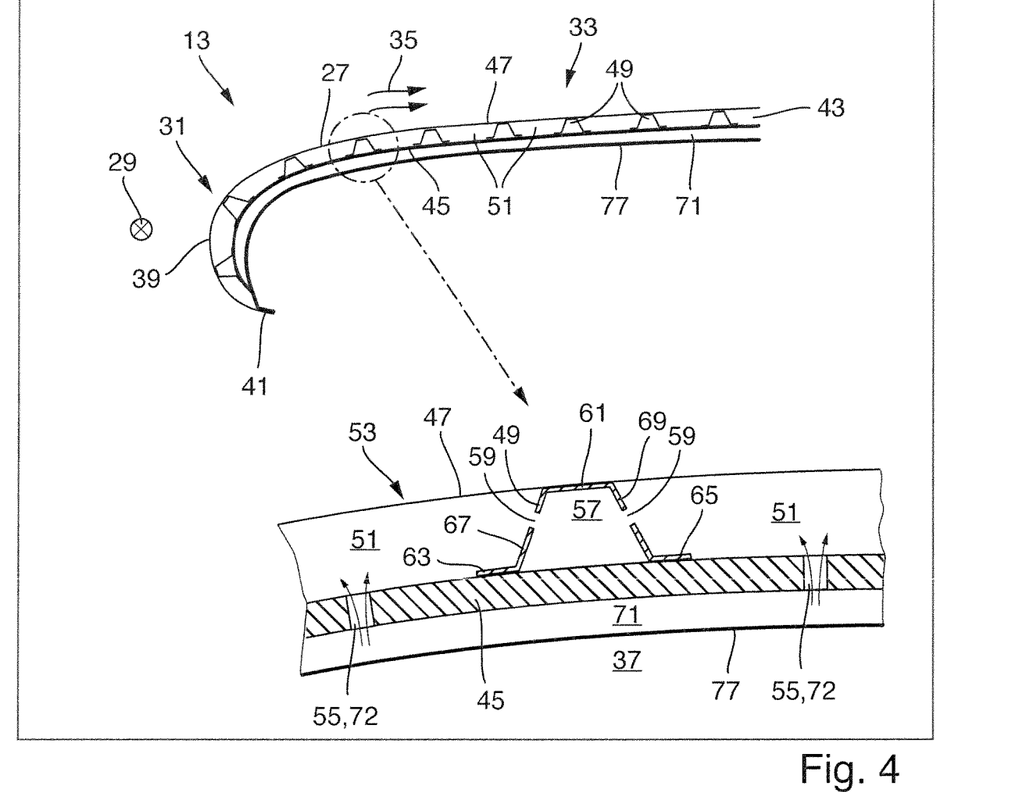
FIG. 4 is a schematic cross sectional view of a leading edge structure according to a third embodiment of the present invention.

The embodiment shown in FIG. 4 differs from the embodiment shown in FIG. 2 merely by the leading edge structure 13 further comprising a plenum wall 77 extending opposite and spaced apart from the inner wall element 45, thereby defining the suction plenum 71 between the plenum wall 77 and the inner wall element 45.

Figure 5:
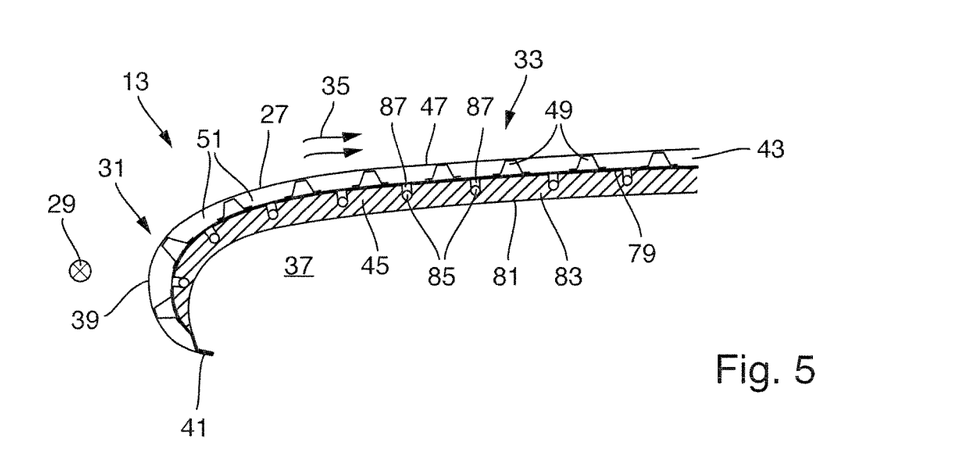
FIG. 5 is a schematic cross sectional view of a leading edge structure according to a fourth embodiment of the present invention.

The embodiment shown in FIG. 5 differs from the embodiment shown in FIG. 2 by the design of the inner wall element 45. Specifically, the inner wall element 45 is formed as a sandwich structure including an outer cover layer 79, an inner cover layer 81, and a core layer 83 sandwiched between the outer and inner cover layers 79, 81. The passages 55 are formed as suction channels 85 that extend through the core layer 83 in parallel to the stiffeners 49 and that have a plurality of suction ports 87 to the hollow chambers 51 arranged in a serial manner along the longitudinal extension of the suction channels 85 and forming a fluid connection between the suction channels 85 and the hollow chambers 51. The vacuum system 15 does not have a suction plenum 71 in this embodiment. The suction channels 85 are directly connected to the suction pipes 21 and via the suction pipes 21 to the vacuum source 19.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading edge structure for a flow control system of an aircraft, comprising
   a double-walled leading edge panel extending in a span direction and, across the span direction, extending between a leading edge and a downstream portion;
   wherein the double-walled leading edge panel comprises an inner wall element and an outer wall element;
   wherein between the inner and outer wall elements, the leading edge panel comprises a plurality of elongate stiffeners spaced apart from one another;
   wherein between each pair of adjacent ones of the elongate stiffeners is a hollow chamber formed between the inner and outer wall elements;
   wherein the outer wall element comprises a plurality of micro pores forming a fluid connection between the hollow chambers and an ambient flow, and
   wherein the inner wall element comprises passages forming a fluid connection between the hollow chambers and a vacuum system,
   wherein the elongate stiffeners form hot air ducts configured to pass hot air along a longitudinal extension of the stiffeners, wherein the hot air ducts are configured to connect to a hot air system, and
   the elongate stiffeners include a plurality of hot air openings forming a fluid connection between the hot air ducts and the hollow chambers configured to pass hot air from the hot air system through the hot air ducts and the hot air openings to the hollow chambers.

2. The leading edge structure according to claim 1, wherein the elongate stiffeners extend in the span direction.

3. The leading edge structure according to claim 2, wherein the inner wall element is formed of a sheet metal.

4. The leading edge structure according to claim 1, wherein the elongate stiffeners are in cross-section omega-shaped and include an upper flange portion resting against the outer wall element, first and second lower flange portions resting against the inner wall element, a first web portion connecting the upper flange portion to the first lower flange portion, and a second web portion connecting the upper flange portion to the second lower flange portion,
   wherein the hot air openings are included in the first web portion and/or in the second web portion.

5. The leading edge structure according to claim 4, wherein the hot air duct is formed between the upper flange portion, the first web portion, the second web portion and the inner wall element.

6. The leading edge structure according to claim 4, wherein the stiffeners include a cross portion extending from the first web portion to the second web portion between the upper flange portion and the first and second lower flange portions,
   wherein the hot air duct is formed between the cross portion, the upper flange portion, and the first and second web portions, and
   wherein an insulation chamber is formed between the cross portion, the inner wall element, and the first and second web portions.

7. The leading edge structure according to claim 1, wherein the inner wall element is formed of a fiber reinforced plastic (FRP).

8. The leading edge structure according to claim 1, wherein the inner wall element is a sandwich structure including an outer cover layer, an inner cover layer, and a core layer sandwiched between the outer and inner cover layers.

9. The leading edge structure according to claim 8, wherein the passages are formed as suction channels that extend through the core layer parallel to the stiffeners and that have a plurality of suction ports to the hollow chambers arranged in a serial manner along a longitudinal extension of the suction channels and forming a fluid connection between the suction channels and the hollow chambers.

10. The leading edge structure according to claim 1, wherein the vacuum system comprises a suction plenum next to the inner wall element.

11. The leading edge structure according to claim 10, further comprising a plenum wall extending opposite and spaced apart from the inner wall element, thereby defining the suction plenum between the plenum wall and the inner wall element.

12. The leading edge structure according to claim 1, wherein the vacuum system comprises a vacuum source.

13. The leading edge structure according to any of claim 1, wherein the outer wall element is formed as a titanium sheet or a steel sheet.

14. An aerodynamic lifting structure for an aircraft comprising
   a front spar,
   an outer skin,
   a leading edge structure according to claim 1,
   a vacuum system, and
   a hot air system,
   wherein the leading edge structure is arranged in front of the front spar such that the outer wall element is aligned with the outer skin, and
   wherein the vacuum system is connected to the passages for applying a vacuum through the passages to the hollow chambers, and
   wherein the hot air system is connected to the hot air ducts to blow hot air through the hot air ducts to the hollow chambers.

15. An aircraft comprising the aerodynamic lifting structure according to claim 14.

16. A leading edge structure of an aerodynamic lifting surface for an aircraft, the leading edge structure including:
- a doubled-wall leading edge panel extending in a span direction of the aerodynamic lifting surface, forming a leading edge of the aerodynamic lifting device and having a trailing edge downstream from the leading edge in a flow direction of ambient air moving over the double-walled leading edge;
- an outer wall panel of the doubled-wall leading edge panel forming the leading edge, forming an outer skin surface exposed to the ambient air and including micro-pores in a leading edge region of the outer wall panel;
- an inner wall panel of the doubled-wall leading edge panel is contiguous with the outer wall panel and includes openings connectable to a vacuum source; and
- stiffeners extending in the span direction and spanning a gap between the inner wall and outer wall, wherein the stiffeners each include hot air openings providing a hot air flow passage between a hot air duct within the stiffener and a hollow chamber between adjacent ones of the stiffeners and between the inner wall and the outer wall,
- wherein the hot air flow passages are connectable to a source of pressurized hot air.

17. A method of operating a leading edge structure of an aerodynamic lifting structure having a doubled walled leading edge panel, the method comprising:
- during flight of an aircraft with the aerodynamic lifting structure, sucking boundary layer ambient air through micro-pores in an outer wall panel of the doubled walled leading edge panel and into hollow chambers formed between the outer wall panel and an inner wall panel of the doubled walled leading edge panel, wherein the boundary layer ambient air is sucked through the micro-pores by applying suction to the hollow chambers;
- during the flight and separately from the drawing of the suction of the boundary layer ambient air, pressurizing the hollow chambers with hot pressurized air flowing through hot air ducts in stiffeners between the inner and outer wall panels and flowing into the hollow chambers through openings in the stiffeners, wherein the hollow chambers are between adjacent ones of the stiffeners, and
- deicing the outer wall panel by the hot pressurized air in the hollow chambers flowing through the micro-pores and into the boundary layer ambient air.

18. The method of claim 17 further comprising ducting the hot pressurized air from an engine of an aircraft including the aerodynamic lifting structure to the hot air ducts in the stiffeners.

19. The method of claim 17 further comprising ducting the boundary layer ambient air from the hollow chambers through openings in the inner wall panel and to ducts connected to a suction source.

20. The method of claim 17 further comprising ceasing the suction while the hot pressurized air flows into the hot air ducts.

* * * * *